(12) United States Patent
Kocher

(10) Patent No.: US 8,266,041 B2
(45) Date of Patent: Sep. 11, 2012

(54) STOCK TRADING LIMIT ORDER COUPLED LINK (LOCK)

(76) Inventor: Robert W. Kocher, Arlington, VA (US)

(*) Notice: Subject to any disclaimer, the term of this patent is extended or adjusted under 35 U.S.C. 154(b) by 381 days.

(21) Appl. No.: 12/153,268

(22) Filed: May 15, 2008

(65) Prior Publication Data

US 2009/0204533 A1     Aug. 13, 2009

Related U.S. Application Data

(63) Continuation of application No. 09/874,070, filed on Jun. 6, 2001, now Pat. No. 7,386,499.

(51) Int. Cl.
*G06Q 40/00*     (2012.01)
(52) U.S. Cl. .......................... 705/37; 705/35
(58) Field of Classification Search ............. 705/37, 705/36
See application file for complete search history.

(56) References Cited

U.S. PATENT DOCUMENTS

| | | | |
|---|---|---|---|
| 6,408,282 B1 * | 6/2002 | Buist | 705/36 R |
| 6,594,643 B1 * | 7/2003 | Freeny, Jr. | 705/36 R |
| 7,383,220 B1 * | 6/2008 | Keith | 705/37 |
| 2002/0188552 A1 * | 12/2002 | Kavounas et al. | 705/37 |

* cited by examiner

*Primary Examiner* — Jagdish Patel
(74) *Attorney, Agent, or Firm* — Clay McGurk; The Law Office of Clay McGurk

(57) ABSTRACT

This invention has the potential to generate very good return on investments from stocks that are conservative in movement. This invention will greatly benefit investors that do not have the time to constantly trade stock yet want to take advantage of normal price fluctuations. The Limit Order Coupled LinK (LOCK) invention, for example, will take a buy order, complete the transaction at the specified price, then automatically resubmits a new order to sell at a specified higher price. If specified, the process can automatically cycle through the buy-sell process a set number of time allowing the investor to take advantage of intra-day market moves and normal stock price fluctuations with no personal investor evolvement. The LOCK order, with set profit margins, allows on-line traders and brokers to place one order, which will automatically generate logical, sequenced additional orders returning a profit on each transaction. LOCK will benefit both the investor and the stock trading company.

23 Claims, 8 Drawing Sheets

STOCK TRADING LIMIT ORDER COUPLED LINK (LOCK)

CROSS REFERENCE TO RELATED APPLICATIONS

This application is a continuation of U.S. application Ser. No. 09/874,070, filed on Jun. 6, 2001, now U.S. Pat. No. 7,386,499.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention applies to buying and selling stocks, options, commodities, bonds, and most forms of equities and securities. This invention has useful application for the individual investor, the securities broker and others who trade securities.

One of the strategies for buying and selling stock is to buy stock at one price forming a 'long' position then selling the stock at another price, closing out that position. Other strategies include forming a 'short' position by borrowing stocks then closing out the position by buying back the securities at another price.

On-line securities trading allow the common investor the ability to buy and sell stocks and securities over the Internet at minimal transaction costs. Numerous electronic trading companies have been established and tens of thousands of individual traders have made tens of millions of securities transactions every week. Many individual traders continue to dedicate hours to buying and selling securities in hopes of benefiting on minor stock price moves. Many must take time out of their regular busy day to watch the market and trade stock. This extra time required detracts from a person's regular job and also leads to less-than-optimal stock trading results.

The current Internet investment approach requires investors to access their accounts to submit a buy order, then re-access their accounts to receive a list of the daily transactions. If an investor submits a limit order, the stock price must reach the limit order price before the transaction takes place; often the order is not filled the same day. If the investor submits a market order, the transaction occurs quickly, but the investor must wait to find out the cost of the transaction that was determined by the market.

In either case, the investor must submit an order, wait for the transaction to occur then develop and submit a second order to close out the position in hopes of making a profit. This current state of the art process is time consuming and may require investors to check their accounts several times a day. The result is loss of time or interference with the investors' regular job, and in a fast-moving market, investors may miss the opportunity to close out their position.

To take advantage of market volatility, investors must continually monitor the market. First they need to decide when to buy, then, once the buy transaction has occurred, they must immediately submit a second order, usually a limit order, to take a sell position and close out the position at a predetermined price.

Of course investors can still use traditional stockbrokers to execute a buy-sell or sell-buy strategy. However using a broker adds to higher transaction cost and the broker must also watch the stock and execute two sequenced orders.

My invention will replace the current methods and processes, allowing investors to lower transaction costs. With my invention, investors can place one order that will buy the security at a preset price and sell the security at a gain price, without requiring additional investor actions.

SUMMARY

The Limit Order Coupled Link (LOCK) invention is designed to allow the online investor or stockbroker to enter one transaction order, which will execute an automatic sequenced transaction strategy for buying and selling a security for a predefined profit. This invention offers a number of advantages. It frees the on-line investor or stockbroker from the burden of monitoring a selected securities price movement. Instead, management software module in the electronic trading system will execute the buy-sell strategy. LOCK simplifies the current process in which investors must submit orders, one to establish an open position and a second to close out a position.

Example

Current method: Two separate orders requiring a time delay to confirm $1^{st}$ order was completed before submitting the $2^{nd}$ order:

| Order | Stock | Quantity | Buy Price |
|---|---|---|---|
| #1 | Buy-XYZ | 100 | 56 |

Once confirmed that transaction is completed then a new order is submitted.

| #2 | Sell-XYZ | 100 | 57 |
|---|---|---|---|

LOCK method: $1^{st}$ order contains information for constructing the $2^{nd}$ order. Therefore, execution of the first order automatically generates the second order. Investors only needs to submit one order:

| Stock | Quantity | Buy Price | Lock Price |
|---|---|---|---|
| XYZ | 100 | 56 | 1 |

The above LOCK order translates to "buy 100 shares of XYZ at $56 per share and once the transaction has occurred (open position), submit a sell order for 100 shares of XYZ at $57 per share." Once the securities are sold the position is closed and the investor walks away with approximately $100.

LOCK offers big advantages, yet is very simple to implement, adding just one more data field. Currently, an electronic transition required at least five data fields: (1) buy or sell, (2) securities symbol, (3) quantity, (4) market price or limit price, and (5) the time the order is good for day-order or good-till-cancel. LOCK adds one more data field. This is the LOCK field that automatically locks a transaction in place at a price the investor determined. An example would be (1) buy (2)

stock XYZ, (3) 100 shares, (4) at market price for a share, (5) good-till-cancel, (6) LOCK 1. This would be translated by the computer network as a buy order for 100 XYZ at market per share and place the order to (1) sell (2) stock XYZ, (3) 100 shares, (4) at purchased price plus $1.00 a share, (5) good-till-cancel. This will allow investors to place their orders and not have to watch the market to complete their strategy. Investors are free to conduct other business and, if the 100 shares of XYZ stock they procured goes up $1.00, the sell order will be executed and he will profit $100.00 minus the transaction costs.

LOCK actually takes some of the risk out of stock trading provides better chances that the investor realizes a profit. Under the current system, investors mentally set a sell price, but then when the stock passes that price often the investor moves the sell price out as well. Then, when the stock price falls, the investor looses profit opportunity until or unless the stock price goes up again. With LOCK, the investor can set disciplined, predefined gains on securities. The investor decides at what price to buy stock and what price to sell it. LOCK automatically buys and sells at the investor's predetermined prices. As a result, the investor need not constantly monitor fluctuating stock prices and is guaranteed a profit should the stock rise to the predetermined sell price.

Another significant advantage of LOCK is that small and part-time investors can realize a profit from smaller stock gains typically produced from daily market volatility. This provides an alternative to "buy and hold" strategies.

DRAWING FIGURES

LIST OF REFERENCE NUMERALS

Figure 1:
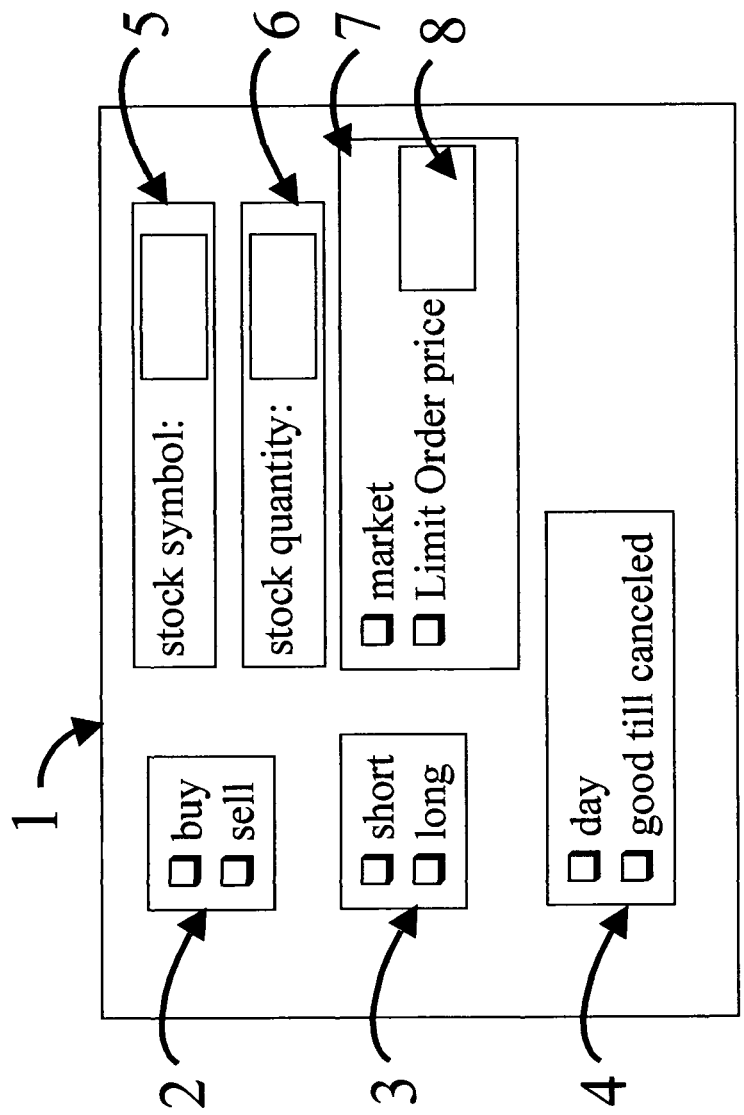
FIG. 1 is an example of the basic information required on an input screen for trading securities as an on-line investor or a broker in today's electronic trading environment.

Item 1 is an example a conventional order and information required to place an electronic equities order.
Item 2 is the buy/sell selection information.
Item 3 is the short/long selection information.
Item 4 is the information on length of time the order is applicable i.e. for the day or good till canceled (GTC).
Item 5 is the stock or equity symbol information.
Item 6 is the quantity of stock or equity information.
Item 7 is the information on the price the equities should be traded at, i.e. at the current market price or specify a market price as a limit order.
Item 8 is the limit order price information.
Item 9 is the Limit Order Coupled Link (LOCK) activation information.
Item 10 is the amount of price that the stock price must move to activate the second transaction the LOCK
Item 11 is the second part of the LOCK transaction buy/sell box which is automatically entered based on the original LOCK order, i.e. a buy order, once executed would then become a sell order.
Item 12 are the steps, items, and process that comprise the LOCK management module.
Item 13 states the timeline of the second LOCK transaction, which would normally be a good to canceled order unless the customer manually enters another conditions such as a day order.
Item 14 is a copy of the stock or equity symbol which is the same as the first transaction.
Item 15 is a copy of the stock quantity which is the same as the first transaction.
Item 16 is the addition (or subtraction) of the LOCK price from the first transaction executed price and placement of the limit order second transaction.
Item 17 is the investor or broker who initiates the electronic order.
Item 18 is a conventional buy/sell order generated by the investor.
Item 19 is the LOCK order generated by the investor.
Item 20 is the electronic security trading company, organization or means for the investor to process his order (such as E-Trade, Ameritrade, etc.).
Item 21 is the electronic order generation process at the electronic trading company.
Item 22 is the electronic order and communication between the electronic trading company and the securities exchange.
Item 23 is the securities exchange (such as NASDAQ, NY Stock Exchange, etc.)
Item 24 is the trading transaction point of the securities exchange where securities are offered and traded (either electronic or voice)
Item 25 is the process of trading the security and filling the transaction order.
Item 26 is the electronic trading company completing the transaction and updating the investor's account, securities and cash position.
Item 27 is the second order that the investor must generate to close out his position i.e. if he bought a stock, now he attempts to sell at a higher price to make a profit.
Item 28 is the electronic order generation process at the electronic trading company (same as Item 21).
Item 29 is the electronic order and communication between the electronic trading company and the securities exchange (same as Item 22).
Item 30 is the trading transaction point of the securities exchange where securities are offered and traded (either electronic or voice) (same as Item 24).
Item 31 is the process of trading the security and filling the transaction order (same as Item 25).
Item 32 is the electronic trading company completing the transaction and updating the investor's account, securities and cash position (same as Item 26).
Item 33 is the process at the electronic trading company to generate a record and generate the LOCK order.
Item 34 is the LOCK order and communication between the electronic trading company and the securities exchange.
Item 35 is the process to prepare the second order including the LOCK increment.

Item 36 is the trading transaction point of the securities exchange where securities are offered and traded (either electronic or voice) (same as Items 24 and 30).

Item 37 is the process of trading the security and filling the transaction order (same as Items 25 and 31).

Item 38 is the electronic trading company completing the first half of the LOCK transaction and updating the investor's account, securities and cash position.

Item 39 is the LOCK electronic order generation process for the second half of the LOCK transaction which includes the LOCK increment and order conversions (FIG. 4) in the new order.

Item 40 is the second part of the LOCK order and communication between the electronic trading company and the securities exchange.

Item 41 is the trading transaction point of the securities exchange where securities are offered and traded (either electronic or voice) (same as Items 24, 30 and 36).

Item 42 is the process of trading the security and filling the transaction order (same as Items 25, 31 and 37).

Item 43 is the electronic trading company completing the transaction and updating the investor's account, securities and cash position (same as Item 26 and 32).

Item 44 is an alternative embodiment of the LOCK order adding an option for the number of cycles the LOCK order should be processed.

Item 45 is an alternative embodiment of the LOCK order adding a option to increase or decrease the stock price for each LOCK cycle.

Item 46 is an investor's computer with the LOCK management module system installed on the computer.

DESCRIPTION

Main Embodiment

The stock and equities trading Limit Order Coupled Link (LOCK) method and invention centers on additional buy/sell profit information contained in the investor's equities order. It also encompasses the software, designed to convert this order into two or more orders that can open and close out the investors position with preset profit goals.

The LOCK method and invention comprises (A) an investor who invests in a securities market with an objective to make a profit; (B) a host securities broker (such as E-Trade, Ameritrade, etc.) with a computer network, for handling their transaction. The host computer network includes a database server that provides an electronic security order template. With this template in place, the host computer network can store and organize security transaction request so that when an investor initiates a transaction, the network processes the request and sends it to a security exchange (such as New York Stock Exchange, NASDAQ, etc.); (C) individual computer workstations for each investor or broker. Each computer workstation would include a video monitor, a means for the investor of broker to send user commands to the host computer network, and a means for the investor or broker to receive and display (on the video monitor) security order templates and instructions transmitted from the host computer network; (D) a communications network electronically linking the investor's computer workstation to the host computer network; (E) a two-part securities exchange order (referred to as the LOCK order) that the investor initiates and that contains specific instructions for the host computer network to transact the security exchange. The LOCK order would include instructions and information for buying or selling a security, the name of the security, the quantity of that security, to buy the limit price or current market price at which to transact the security exchange and the increase or decrease in security price to initiate part-two of the transaction (referred to as the LOCK profit); (F) a software module that allows the investor at the computer workstation to interact with the host computer network. With this software the investor can select security exchange options and transmit them to the host computer network then receive confirmation that was underway. (G) an additional software module (referred to as the LOCK management module) as part of the securities broker host computer network. This software would link the host computer network to the security exchange markets and track and monitor the status of the investor's LOCK order. At the appropriate market price, the software would initiate a two-part, sequenced securities exchange order to buy a stock at the investor's specified price, then add the specified desired profit price and place a second order.

With LOCK the investor could enter as little as one extra data field when placing a stock order. This additional information would be the LOCK profit margin. By entering this number, the investor would tell the investment company or securities broker to execute a LOCK transaction (buy and sell linked limit order).

Currently the minimum information required for an electronic transition is buy or sell 2, securities symbol 5, quantity 6, market price or limit price 8, and the time the order is good for day order or good till canceled 4. A LOCK order adds one more data field. This field is the LOCK field of the change in security price such as 1¼ or 1.00 representing $1.25 or $1.00 change in stock price. An example would be: buy, 100 shares of stock XYZ, at market price for a share, "good to cancel", LOCK 1. Good to cancel term referrers to the order as being placed until filled or canceled by the investor. This would be translated by the computer network as a buy order for 100 XYZ at market per share and then immediately place an order to sell 100 shares of XYZ stock at purchased price plus $1.00 a share, with an order that is "good to cancel". This allows the investor to place an order and be free to conduct other business. If the 100 shares of XYZ stock the investor has procured goes up $1.00 LOCK would automatically execute the sell order ensuring a profit of $100 minus the transaction costs. LOCK allows investors to make predefined gains.

OPERATION

Main Embodiment

The LOCK method and invention centers on additional buy/sell profit information contained in the investor's equities order. It also encompasses the software that converts an investor's order into two or more orders that open and close out the investor's position with preset profit goals.

FIG. 1 shows information typically required and found on electronic transaction equities order 1 today, including instructions from the investor to buy or sell 2, whether to form a long (buy) or short (sell short) position 3, the time the order is valid either for the remainder of the market day then canceled (also referred by investors as "fill or kill") or the leave the order valid for multiple days until filled or canceled by the investor 4, the stock symbol 5, the quantity of stock 6, whether the order is a market order (to trade at the prevailing trading price) 7, or a Limit Order (to trade at a specific price or better) 8.

Figure 2:
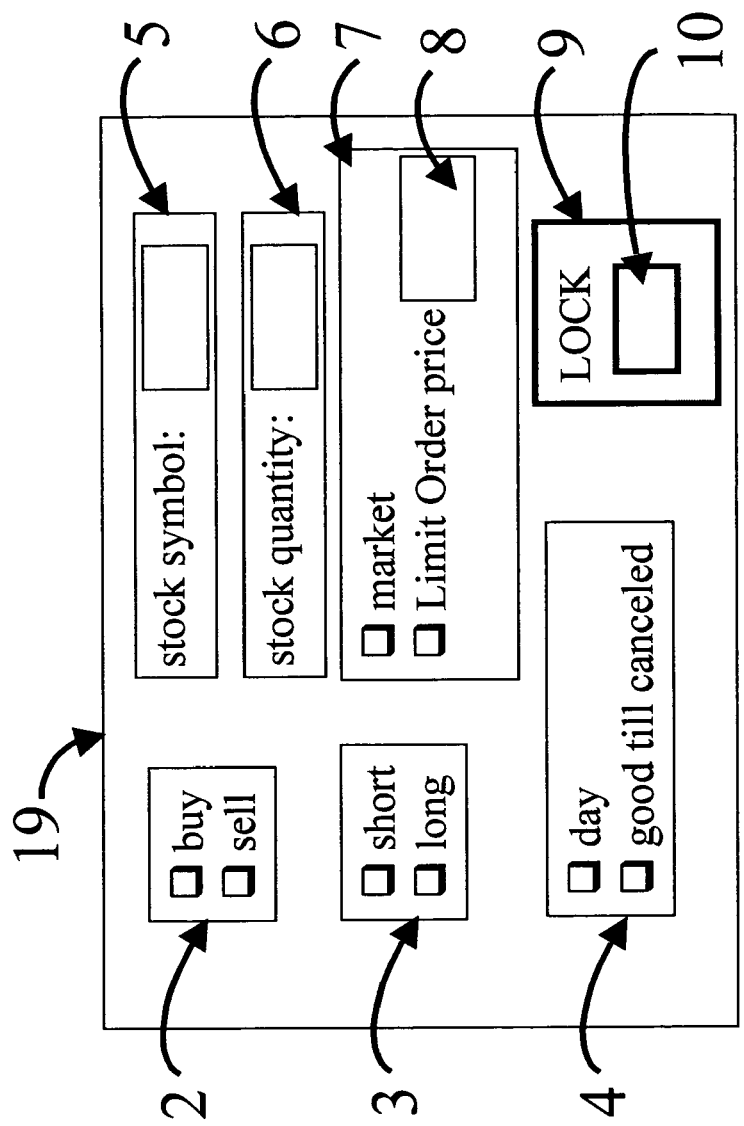
FIG. 2 is an example of the current electronic trading information required with the addition of the LOCK information.

FIG. 2 is shows the addition of the LOCK information box 9, to the FIG. 1 example order form. If an investor wished to execute a LOCK trade, the investor would simply add the movement value of the equity 10 to close out the position.

This simple addition of information LOCK value 10 is all that the investor would have to add to execute the LOCK process. If the investor enters an order to buy a stock and enters a 1.00 in the box this would be interpreted by the LOCK process (FIG. 3) and module (FIG. 5) to sell the equity at 1.00 more than the purchase price. Alternate embodiment of this number could be to have the investor specify the amount of profit desired such as $150.

Figure 3:
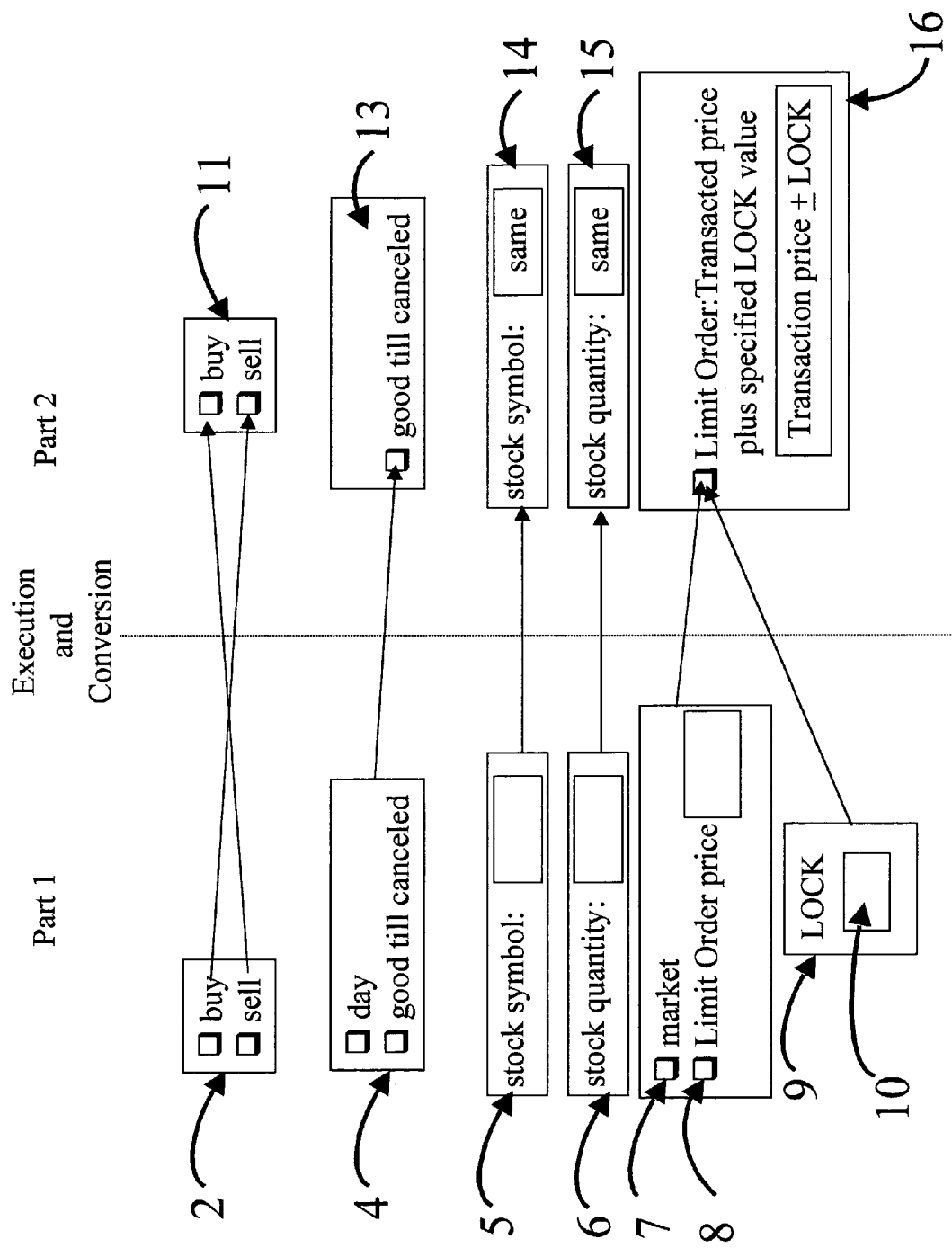
FIG. 3 shows the conversion and translation of the conventional order with LOCK information into two sequenced orders, part 1 and part 2.

FIG. 3 shows the logic execution and conversion of the LOCK invention and process. FIG. 3's right side represents the investor's input request that is used to execute Part one of the LOCK process. The buy/sell instruction 2 convert from part 1 from buy to part 2 to sell 11. An example is if the order states to buy 100 XYZ, part 1 will buy then convert to a sell order in part 2. The order's time to be valid box in part 1 can be specified as day or good to canceled 4. If part 1 on the LOCK order is executed, this information will convert to a good till canceled order. An option for the investor is to see the status of his order and request modification to the LOCK order or cancel the second half of the LOCK order if unexecuted. An example may be that the investor's LOCK order is executed and he now holds 100 shares of XYZ and is waiting for a LOCK price move of 2.00 before he sell. During this time the investor queries the electronic investment company on the status of the LOCK order and sees that part one has been executed and now wished to cancel the "sell" order in part 2 of the LOCK order. The investor submits a cancellation request and, if received in time, the LOCK order could be canceled and the investor would only have part 1 of the LOCK order's results. Similarly, if the investor wished to cancel the entire LOCK order before part 1 has been executed, the order would be cancelled in a method similar to canceling traditional unexecuted orders.

The stock symbol 5, and stock quantity 6, remains the same in part 1 and part 2. Alternate embodiment could change the quantity, such as selling half in part 2 then cycling through part 2 again selling the second half a an increased price. The price selection for part 1 involves either a market order 7, which executes the trade at the prevailing market rate or a Limit Order 8, which specifies a price. For the investor to execute a Limit Order normally he or she must check a box and enter the price at which to execute it or if market conditions permit, at a better price. The part 1 order executed price in combination with information in the LOCK box 9, and the LOCK price 10, will form the Limit Order execution price for the part 2 of the LOCK transaction.

Figure 4:
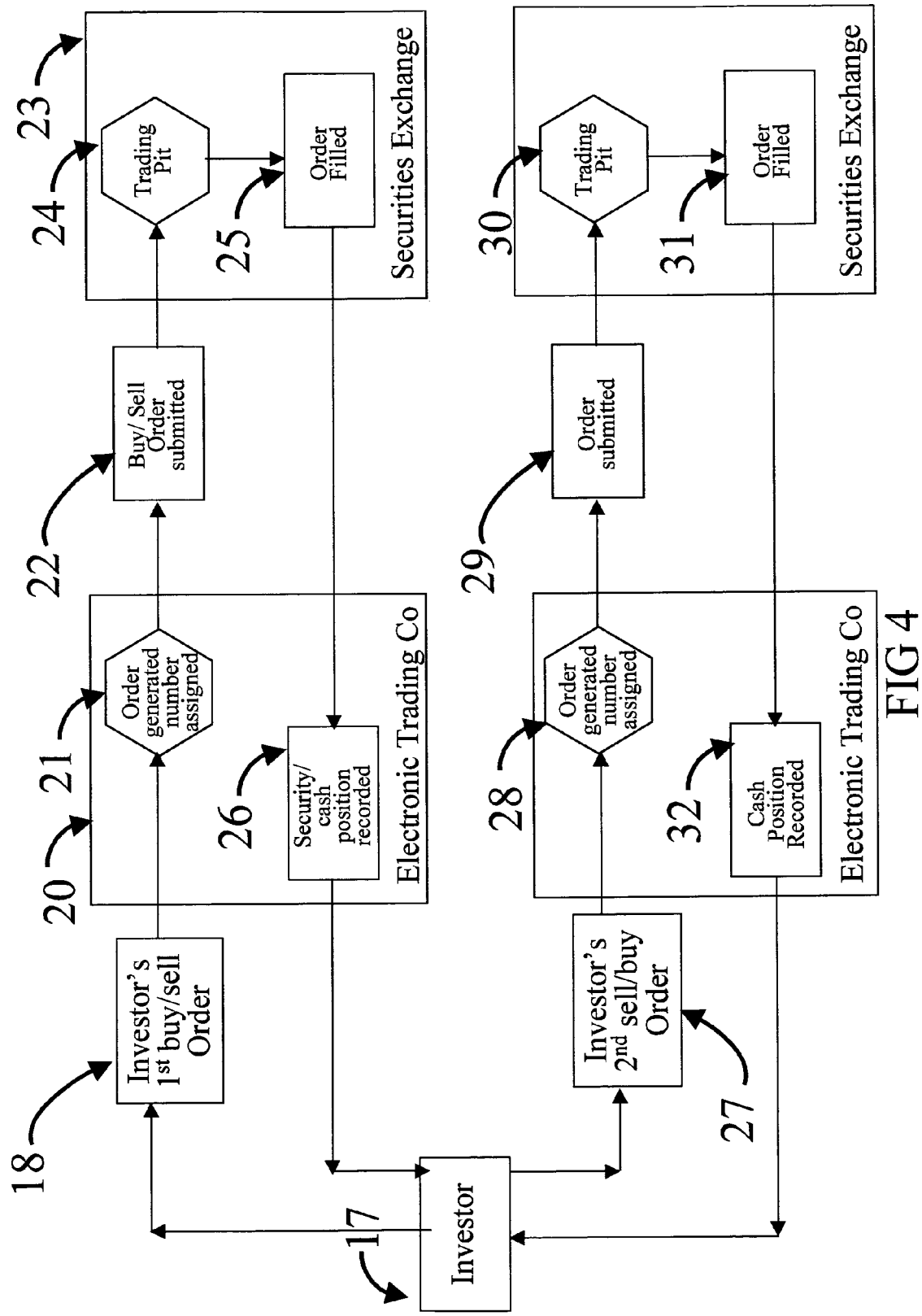
FIG. 4 shows the conventional electron trading process requiring two orders to open and close a position.

FIG. 4 shows the conventional electronic trading process requiring two orders to open and close a position. The process begins with the investor 17 placing a buy or sell order 18 with an electronic trading company or organization 20. The electronic trading company 20 generates an electronic order 21 that is submitted 22 to a securities exchange 23. The order 21 is presented in the trading pit 24 and when a buyer/seller accepts the order, the order is filled 25. Once the order has been executed or filled 25, the electronic trading company is notified and the investor's account is documented 26 and the investor 17 is informed. The investor 17 must now place another order 27 to close out his or her position and make a profit. An example of this process would be if an investor 17 initiated the process to buy 100 shares of stock XYZ at $50.00 a share 18, received notification that the order was fully executed 26 now the investor 17 must resubmit an order 27 to sell 100 shares of XYZ at $52.00 to make a profit. The order 27 is submitted to the electronic trading company where a new order is generated 28, order submitted 29, presented in the trading pit 30, filled, 31 documented and the account is updated and the investor notified 32. Current state of-the-art methods require the investor or broker 17 to be involved in both transactions.

Figure 5:
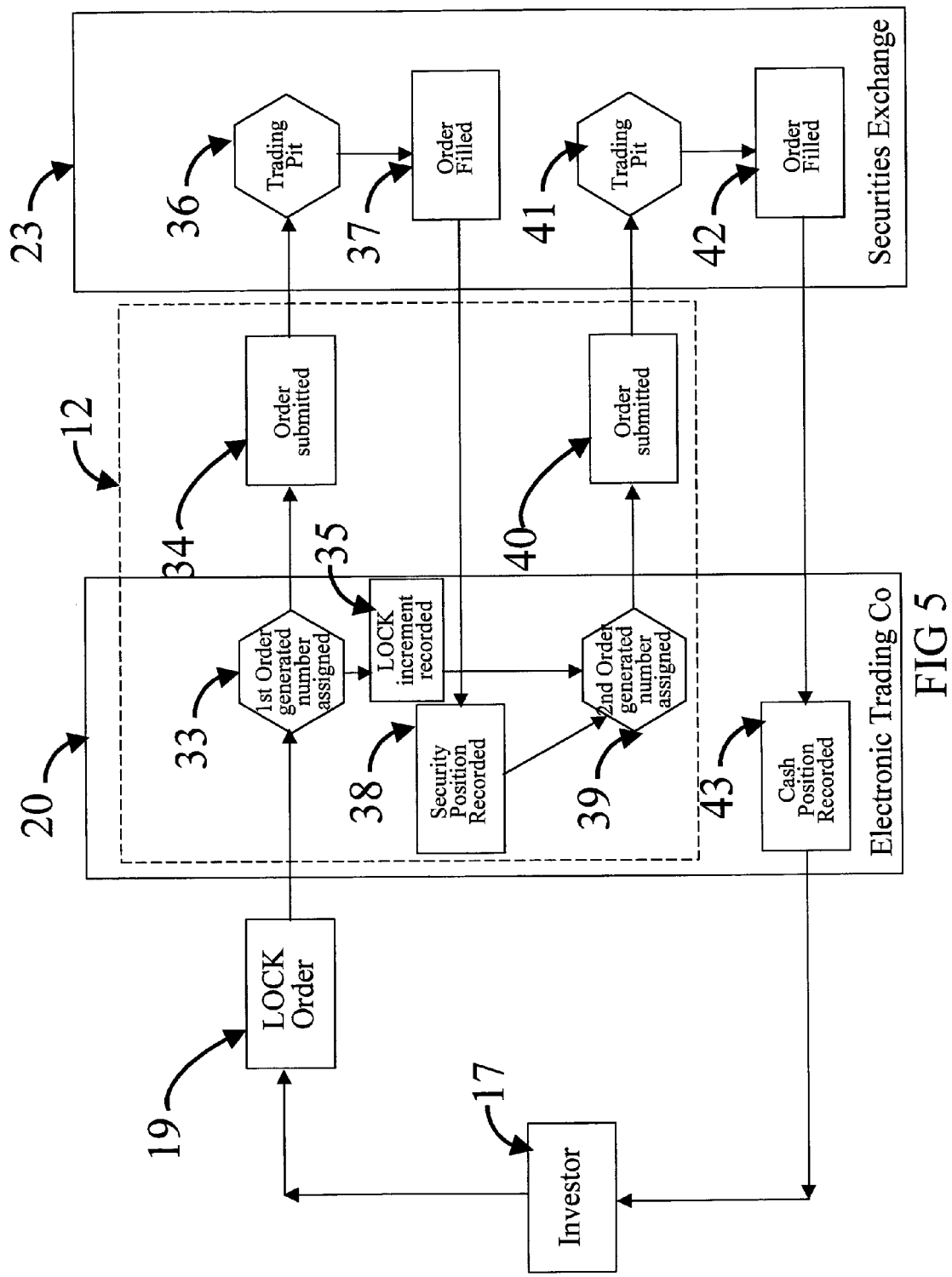
FIG. 5 shows the LOCK method, process and order flow sequence for opening and closing a position using a LOCK order.

FIG. 5 shows the main embodiment of the LOCK method, process and order flow sequence for opening and closing a LOCK order. The method begins with the investor 17 submitting a LOCK order 19, which contains sufficient information as described in FIG. 3. The LOCK order 19 is submitted to the electronic trading company 20 where the order is identified as a LOCK order and enters the LOCK management module process 12. The LOCK management module 12 comprises the software interfaces that receive the LOCK order 19 document and generate a tracking record 33, record the LOCK increment 35, monitor the submission of the first part of the LOCK order submission 34, as the order 34 enters the securities exchange 23 trading pit 36, and the order is filled 37, then record the first order being filled 38, generate the second part of the LOCK order 39, and submit the second part of the LOCK order 40. The second part of the LOCK order 40 is resubmitted to the trading pit 41 and once the second order is filled 42, the electronic trading company 20, records the account balance 43 and notifies the investor 17 that the LOCK transaction has been completed.

The LOCK management module 12 will also provide the investor 17 with status when requested. For example, if the investor 17 wishes to check on the status of the LOCK order 19, he or she could electronically contact the electronic trading company 20 and receive an update on the LOCK order 19—for example, where the order was in the process, such as whether the first part of the LOCK 19 order was filled 37, second part of order submitted 40 and in whether it was the trading pit 41 waiting to be filled.

DESCRIPTION AND OPERATION

Alternative Embodiments

Figure 6:
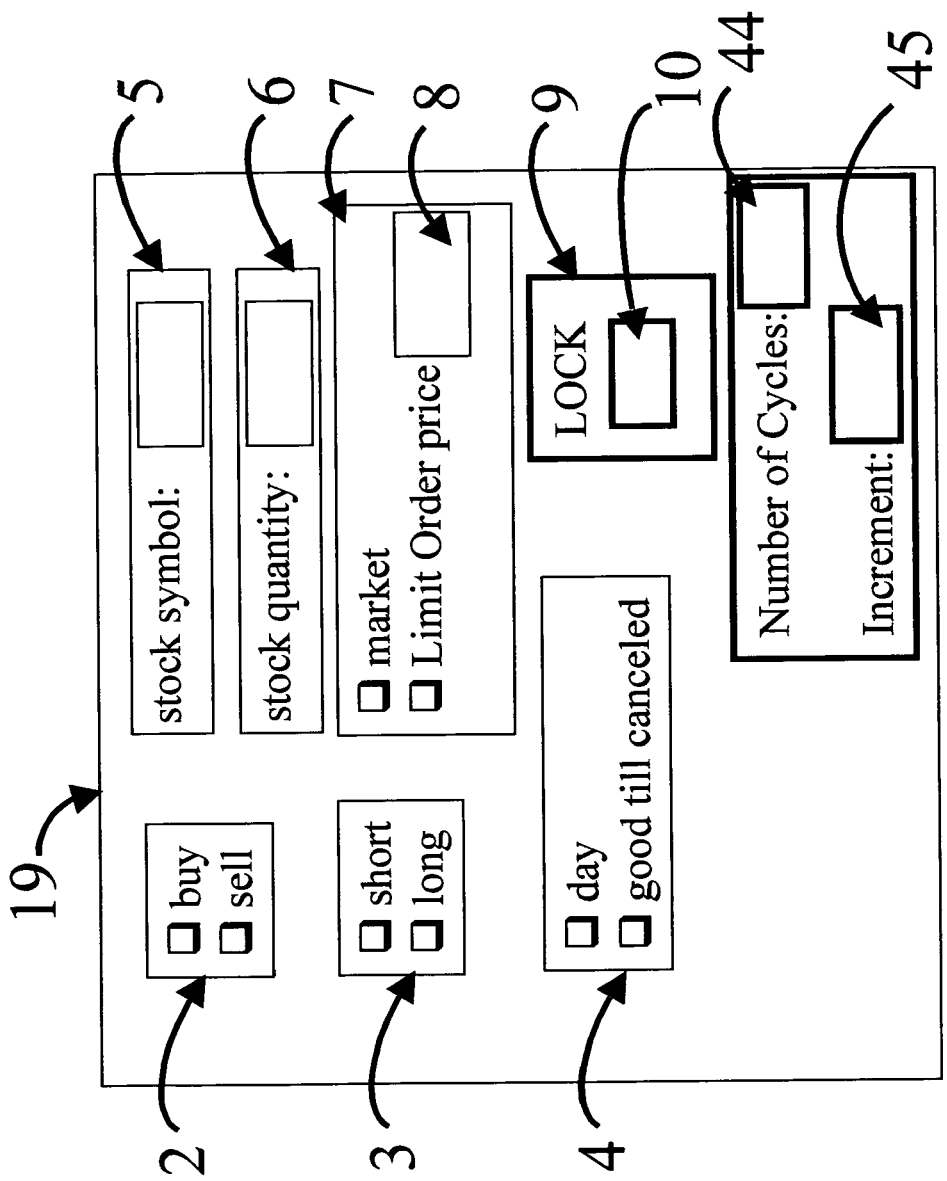
FIG. 6 shows an alternative embodiment of the LOCK method by adding options of number of cycles and increments in price changes for each increment.
Figure 7:
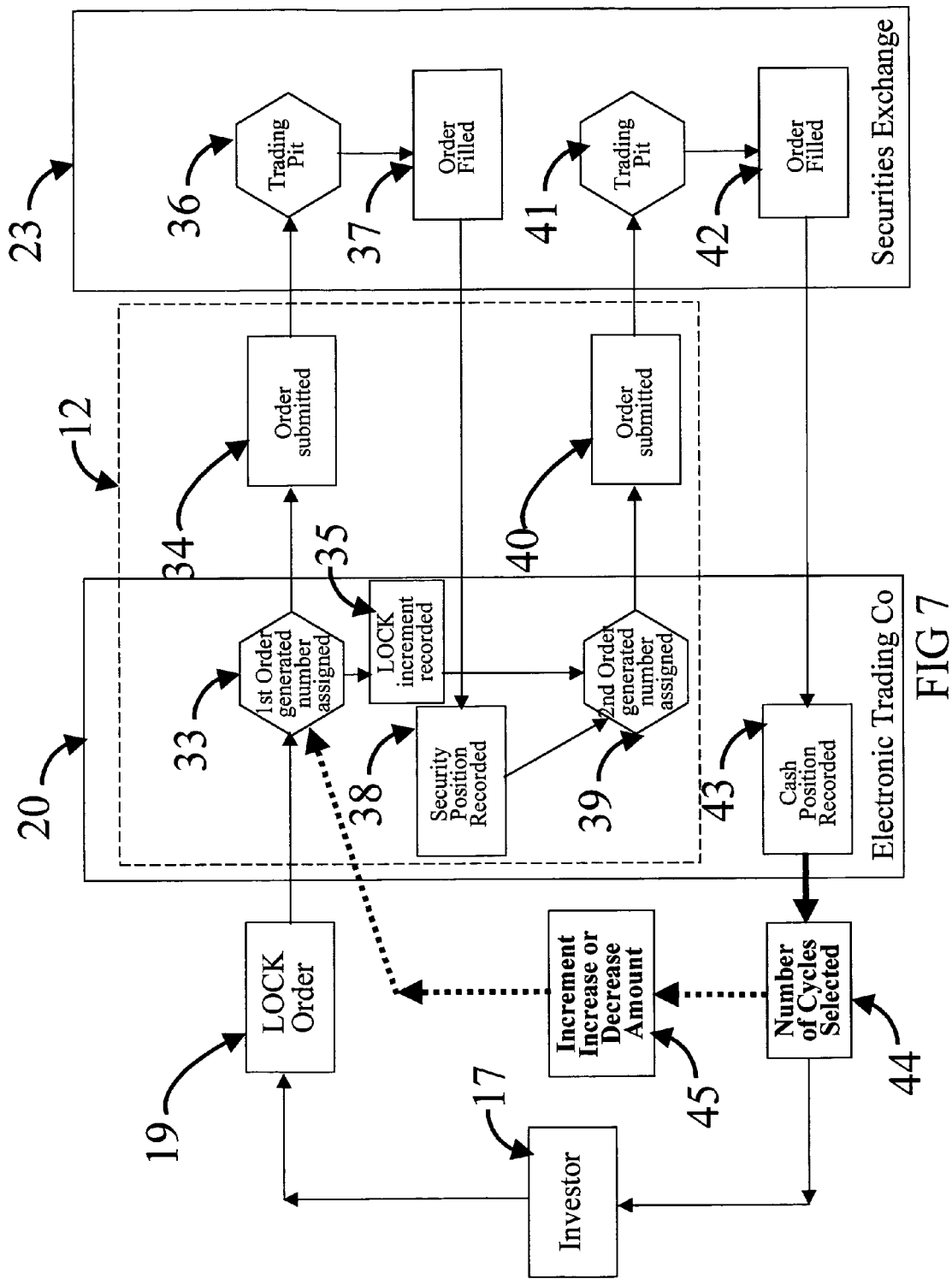
FIG. 7 shows how an alternative embodiment would be integrated into the LOCK method and management module.

Alternative embodiments include inserting the option to automatically re-cycle through the process again and an additional option to increase or decrease the buy/sell prices. FIG. 6 and FIG. 7 shows alternative embodiment of the LOCK method by adding a number of cycles and increment options to the methodology. FIG. 6 shows the additional information required to cycle through the process. FIG. 7 shows the methodology for reentering the LOCK management module 12. The addition of "Number of Cycles" 44 would allow the investor to automatically reenter the LOCK process again in hopes of making more profit. An example of specifying two cycles would mean to buy 100 shares of XYZ (with a LOCK price of $1) at $50 a share, sell at $51 a share, buy back at $50 and sell again at $51. This investment process would allow the individual investor to take advantage of daily small stock fluctuations.

Another option would be to increase the price increment for each cycle 45. Investors would use this process to take advantage of a stock price that is moving up. An example is specifying buy 100 XYZ at $50.00 with a LOCK price of $1, number of cycles of 3 and an increment of $0.50. This would translate to buy 100 shares of XYZ at $50.00, sell at $51.00, buy back at $51.50, sell at $52.50, buy back at $52.00, and sell at $53.00.

Another embodiment would be to locate the LOCK management module 12 on the investor's own computer.

Figure 8:
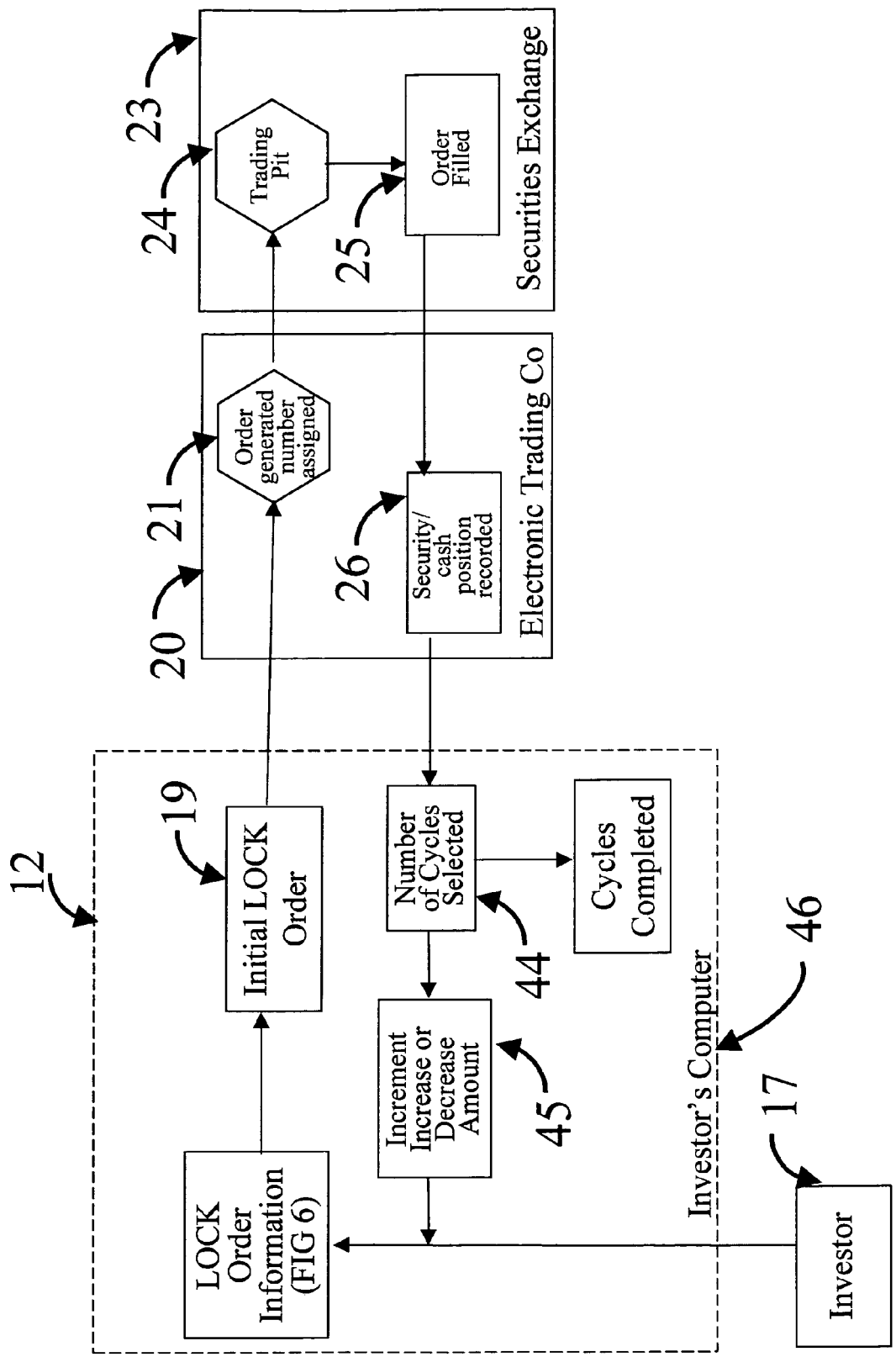
FIG. 8 shows an alternative embodiment of locating the LOCK control and management module on the investor's computer.

FIG. 8 is an alternative embodiment that would locate the LOCK management software module 12 on an investor's computer 46. This method and approach is similar to the primary methodology requiring LOCK information to automatically generating multiple sequenced orders and executing the number of cycles and increments selected by the investor discussed below.

The LOCK process could include an option allowing an investor to cancel a LOCK order anytime during the process. For example an investor could decide to hold on to a stock purchased in part 1 of the LOCK order then cancel the sell side (part 2) of the LOCK order. The stock symbol 5, and stock quantity 6, remains the same in part 1 and part 2. Alternate embodiment could change the quantity, such as selling half in part 2 then cycling through part 2 again, selling the second half at an increased price.

An alternative embodiment of the LOCK invention method is to use percents as the LOCK, rather than stock prices. For example an investor could enter a percent, such as 2%, rather than 1.5 points of stock price. Suppose the stock is trading for $40.00 a share. The investor could enter 1.5 meaning a move of $1.50 up would constitute a sell limit order or by using percents, the investor could enter 2%, meaning a move of $0.80 cents up would initiate a sell limit order.

Additional percent alternatives in defining the LOCK with respect to the trade price could be offered to the investor to discount the trade or commission costs. An example would be if a stock is selling for $100.00 a share and the investor wishes a 5% gain, and the cost of a limit order transaction is $10.00 then the trade in and out cost is $20.00 so the LOCK could be interpreted as trade at a 5% gain after charges and commission. The trade that completes the LOCK would be $107.00 a share based on 100 shares and a LOCK of 5% profit. Percentage LOCKs offer the investor a simpler conversion for setting investment goals.

CONCLUSION, RAMIFICATIONS, AND SCOPE

The LOCK invention and methodology will allow investors to define specific investment strategies and execute these strategies with minimal involvement. This invention will further allow investors to take advantage of small and repetitive stock price movement that, over time could translate to significant profits. The LOCK management module can reside at an online investment company or on investors' computers. This invention will significantly increase the volume of trades for online investment companies. This strategy moves away from traditional by-and-hold strategies to one of attempting to mass small but consistent gains. LOCK is especially advantageous to the average investor who does not have much time to watch the market's constant motion.

What I claim as my invention is:

1. A method executed on a server of a host securities broker from stored, computer-executable instructions for automatically trading a security in a sequence of transactions at a securities exchange, comprising the steps of:
   receiving a customer order over the Internet at the host securities broker to trade a security, the customer order comprising a first condition that specifies when to execute a first order for trading the security, and a second condition that specifies when to execute a second order for trading the security after the first condition has been satisfied;
   tracking at the host securities broker a current market price of the security;
   determining at the host securities broker whether the first condition has been satisfied;
   transmitting from the host securities broker the first order for execution at the securities exchange when the current market price satisfies the first condition;
   receiving at the host securities broker a confirmation of the execution of the first order;
   determining at the host securities broker whether the second condition has been satisfied; and
   transmitting from the host securities broker the second order for execution at the securities exchange when the current market price satisfies the second condition.

2. The method of claim 1, wherein the first condition is designated as a current market price, a specified price, or a limit price.

3. The method of claim 2, wherein the second condition is specified as a percentage difference from the first price, an amount of change from the first price, or a fixed price.

4. The method of claim 1, wherein the first order includes a period of time for which the first order and the second order are valid.

5. The method of claim 4, wherein the period of time can be specified in hours, days, months or years.

6. The method of claim 4, wherein the period of time includes a designation where the first order and the second order are good until cancelled.

7. The method of claim 1, wherein the first order includes a quantity of the security being bought in the first order and a second quantity of the security being sold in the second order.

8. The method of claim 1, further comprising the step of receiving a confirmation at the host securities broker of the execution of the second order if the second order was executed.

9. The method of claim 1, wherein the first order includes a number of additional buy-sell iterations, and wherein the method includes the steps of repeating the method steps for each of the number of the additional buy-sell iterations.

10. The method of claim 9, wherein the price of the security in each of the additional buy-sell iteration is automatically and incrementally modified.

11. The method of claim 1, wherein the first condition is a first price and the second condition is a second price.

12. The method of claim 1, wherein the first order is a buy order and the second order is a sell order.

13. The method of claim 1, wherein the first order is a sell order and the second order is a buy order.

14. The method of claim 1, wherein the first condition or the second condition require that the market price is greater than the second price.

15. The method of claim 1, wherein the first condition or the second condition require that the market price is less than the second price.

16. The method of claim 1, wherein the first condition or the second condition require that the market price is equal to the second price.

17. The method of claim 1, wherein a modification to the customer order cancels the pending transmission of the second order before the second condition is met.

18. The method of claim 1, wherein a modification to the customer order cancels the pending transmission of the first order before the first condition is met.

19. The method of claim 1, further comprising the step of sending a template over the Internet from the host securities broker to each customer, the template being used for entering each customer order.

20. The method of claim 1, further comprising the step of providing a confirmation for the customer order once the customer order has been completed.

21. A computer of a host securities broker that is configured to communicate with a securities exchange, comprising:
   a computer that is configured for receiving over the Internet at the host securities broker a customer order to trade a security, the customer order comprising a first condition that specifies when to execute a first order for trading the security, and a second condition that specifies when to execute a second order for trading the security after the first condition has been satisfied, tracking at the host securities broker a current market price of the security, for determining at the host securities broker whether the first condition has been satisfied, for transmitting from the host securities broker the first order for execution at the securities exchange when the current market price of the security satisfies the first condition, for receiving at the host securities broker a confirmation of the execution of the first order, for determining at the host securities broker whether the second condition has been satisfied, and for transmitting from the host securities broker the second order for execution at the securities exchange when the current market price satisfies the second condition.

22. A system that is configured to communicate with a securities exchange, comprising:

a plurality of servers controlled by a host securities broker, wherein the plurality of servers are configured for receiving over the Internet at the host securities broker a customer order to trade a security, the customer order comprising a first condition that specifies when to execute a first order for trading the security, and a second condition that specifies when to execute a second order for trading the security after the first condition has been satisfied, tracking at the host securities broker a current market price of the security, for determining at the host securities broker whether the first condition has been satisfied, for transmitting from the host securities broker the first order for execution at the securities exchange when the current market price of the security satisfies the first condition, for receiving at the host securities broker a confirmation of the execution of the first order, for determining at the host securities broker whether the second condition has been satisfied, and for transmitting from the host securities broker the second order for execution at the securities exchange when the current market price satisfies the second condition.

23. A method executed on one or more servers associated with a host securities broker from stored, computer-executable instructions for automatically trading a security in a sequence of transactions at a securities exchange, comprising the steps of:

receiving a customer order over the Internet at the host securities broker to trade a security, the customer order comprising a first condition that specifies when to execute a first order for trading the security, and a second condition that specifies when to execute a second order for trading the security after the first condition has been satisfied;

tracking at the host securities broker a current market price of the security:

determining at the host securities broker whether the first condition has been satisfied;

transmitting from the host securities broker the first order for execution at the securities exchange when the current market price satisfies the first condition;

receiving at the host securities broker a confirmation of the execution of the first order;

determining at the host securities broker whether the second condition has been satisfied; and transmitting from the host securities broker the second order for execution at the securities exchange when the current market price satisfies the second condition.

* * * * *